US007151910B2

(12) United States Patent
Suzuki et al.

(10) Patent No.: US 7,151,910 B2
(45) Date of Patent: Dec. 19, 2006

(54) WIRELESS MICROPHONE INFORMATION DISPLAYING APPARATUS AND METHOD THEREOF

(75) Inventors: Motoshi Suzuki, Kanagawa-ken (JP); Hiroshi Yamamoto, Kanagawa-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 602 days.

(21) Appl. No.: 10/452,182

(22) Filed: Jun. 2, 2003

(65) Prior Publication Data

US 2003/0224732 A1 Dec. 4, 2003

(30) Foreign Application Priority Data

Jun. 3, 2002 (JP) ............................ 2002-162027

(51) Int. Cl.
*H04B 7/00* (2006.01)

(52) U.S. Cl. .................... 455/41.2; 455/572; 455/573; 455/566; 381/74; 381/82; 381/92

(58) Field of Classification Search ............... 455/41.2, 455/572, 573, 569.1, 518, 127.1, 566; 381/74, 381/82, 92

See application file for complete search history.

(56) References Cited

U.S. PATENT DOCUMENTS 6,349,283 B1 * 2/2002 Sanders ...................... 704/278
7,010,328 B1 * 3/2006 Kawasaki et al. .......... 455/212
7,012,402 B1 * 3/2006 Miller et al. ................ 320/106
2003/0036413 A1 * 2/2003 Ylo ............................ 455/569
2003/0147540 A1 * 8/2003 Oster et al. ................. 381/111

FOREIGN PATENT DOCUMENTS

EP 1 309 222 A3 6/2003
JP 2002-135156 A 5/2002

* cited by examiner

*Primary Examiner*—Matthew D. Anderson
*Assistant Examiner*—Sanh Phu
(74) *Attorney, Agent, or Firm*—Pearne & Gordon LLP

(57) ABSTRACT

The wireless microphone information displaying apparatus comprise a plurality of wireless microphones having information respectively assigned thereto, a wireless microphone supporting device having a plurality of supporting portion for supporting the microphones, respectively, and a plurality of connecting devices for electrically connecting the microphones with the unit. Each of the microphones contains a wireless microphone control unit. The supporting device comprises a unit control unit, a display panel for displaying the information assigned to the microphones. The microphone information is displayed on the display panel, when the microphones are supported o the supporting device.

3 Claims, 9 Drawing Sheets

WIRELESS MICROPHONE INFORMATION DISPLAYING APPARATUS AND METHOD THEREOF

FIELD OF THE INVENTION

This invention relates to wireless microphone information displaying apparatus and method thereof, and more particularly to wireless microphone information displaying apparatus and method thereof to display pieces of wireless microphone information assigned to wireless microphones, respectively, on a display panel mounted on a wireless microphone supporting device for supporting a plurality of wireless microphones.

DESCRIPTION OF THE RELATED ART

Up until now, there have been proposed a wide variety of conventional wireless microphone information displaying apparatuses one typical example of which is shown in FIG. 9. The conventional wireless microphone information displaying apparatus is shown in FIG. 9 as comprising a display panel exemplified by a liquid crystal display panel 91, and a wireless microphone control unit 92 for controlling the display panel 91 to allow the display panel 91 to display the wireless microphone information concerning the wireless microphone. Both of the display panel 91 and the wireless microphone control unit 92 are mounted on a wireless microphone with a radio signal transmitting unit 93 for transmitting a radio signal such as for example an audio signal.

The wireless microphone information herein disclosed includes an identification number assigned to the wireless microphone for identifying the wireless microphone from the remaining wireless microphones, a selected channel selected from among the channels assigned to each of the wireless microphones to allow the radio signal transmitting unit 93 to transmit the radio signal, and a residual electrical power amount of a battery mounted on each of the wireless microphones. The wireless microphone control unit 92 serves to control the display panel 91 to display the above mentioned wireless microphone information.

In the event that the wireless microphones are concurrently used in the conventional wireless microphone displaying apparatus, the operators operating the respective wireless microphones cannot frequently check the respective amounts of the residual electric powers of the wireless microphones and can scarcely confirm whether or not the channel the operators set to the wireless microphones at present time is identical to the channel the remaining operators set to the remaining wireless microphones.

The fact that the respective amounts of the residual electric powers of the wireless microphones are not checked leads to the fact that the radio signal from the wireless microphone is interrupted from being transmitted to a signal receiving unit where the radio signal is processed. No confirmation made on whether or not the channel the operators sets at present time is identical to the channels the remaining operators set to the remaining wireless microphones results in the fact that the radio signals transmitted from the wireless microphones tend to interfere with one another.

In order to avert such an interference caused when the identical channel are concurrently used by the operators, the conventional wireless microphone information apparatus is required to prepare a manager who can manage for the operators not to concurrently use the identical channel with a memorandum allowing the manager to describe the relationship between the specified channel and the remaining channels.

Therefore, a problem encountered with the conventional wireless microphone information apparatus is such that the task for describing on the memorandum is inevitably a heavy burden to be shouldered on the manager or a laborious work for the manager.

SUMMARY OF THE INVENTION

It is, therefore, an object of the present invention to provide a wireless microphone information displaying apparatus and a method thereof which can remove such a heavy burden or a laborious work for the manager and can make it easy for the manager to manage the wireless microphones concurrently used.

In accordance with a first aspect of the present invention, there is provided a wireless microphone information displaying apparatus, comprising: a plurality of wireless microphones having initial wireless microphone information respectively assigned thereto; a wireless microphone supporting device having a plurality of supporting portions for supporting the wireless microphones, respectively; and a plurality of connecting devices each having a first connecting terminal mounted on each of each of the wireless microphones, and a second connecting terminal mounted on each of the supporting portion of the wireless microphone supporting device, the first connecting terminals and the second connecting terminals being electrically connected to each other; each of the wireless microphones including wireless microphone information outputting means for outputting the initial wireless microphone information to the first connecting terminals, respectively; and the wireless supporting device including wireless microphone information receiving means for receiving pieces of the initial wireless microphone information outputted by the information wireless microphone outputting means of the wireless microphones through the second connecting terminals, and wireless microphone information displaying means for displaying the initial wireless microphone information received by the initial wireless microphone information receiving means when the first connecting terminals of the wireless microphones are electrically engaged with the second connecting terminals, respectively, of the supporting device.

The wireless microphone supporting device may include wireless microphone information modifying and outputting means for modifying the initial wireless microphone information into another type of wireless microphone information to have said another type of wireless microphone information being distinguished from said initial wireless microphone information, and outputting the modified wireless microphone information to the second connecting terminals.

Each of the wireless microphones may include modified wireless microphone information receiving means for receiving the modified wireless microphone information from the wireless microphone information modifying and outputting means through the first connecting terminals, and modified wireless microphone information setting means for setting the modified wireless microphone information for revising the original microphone information.

The wireless microphone supporting device may include arranging means for arranging one sequence of pieces of the modified wireless microphone information modified by the wireless microphone information modifying and outputting means or pieces of the initial wireless microphone information outputted from the wireless microphone information outputting means to the other sequence in order to display the initial wireless microphone information and the modified wireless microphone information simultaneously to display the initial wireless microphone information and the modified wireless microphone information on the wireless microphone information displaying means.

Further, the wireless microphone supporting device further includes a electric power source to charge rechargeable batteries mounted on the wireless microphones through the connecting devices, when the first connecting terminals of the wireless microphones are electrically engaged to the second connecting terminals of the supporting device.

In accordance with the second aspect of the present invention, there is provided a wireless microphone information displaying method, comprising: a preparing step of preparing a wireless microphone information displaying apparatus, comprising: a plurality of wireless microphones having initial wireless microphone information respectively assigned thereto; a wireless microphone supporting device having a plurality of supporting portions for supporting the wireless microphones, respectively; and a plurality of connecting devices each having a first connecting terminal mounted on each of the wireless microphones, and a second connecting terminal mounted on each of the supporting portion of the wireless microphone supporting device, the first connecting terminals and the second connecting terminals being electrically connected to each other; each of the wireless microphones including wireless microphone information outputting means for outputting the initial wireless microphone information to the first connecting terminals, respectively; and the wireless supporting device including wireless microphone information receiving means for receiving pieces of the initial wireless microphone information outputted by the wireless microphone information outputting means from the second connecting terminals, and information displaying means for displaying the initial wireless microphone information received by the initial wireless microphone information receiving means when the first connecting terminals of the wireless microphones are electrically engaged with the second connecting terminals, respectively of the supporting device, a first step of determining whether or not at least one of the wireless microphones is electrically connected to the wireless microphone supporting device; a second step of outputting the wireless microphone information assigned to the wireless microphones, respectively, from the wireless microphone information outputting means mounted on the wireless microphones, respectively, when the first step determines that at least one of the wireless microphones is electrically connected to the wireless microphone supporting device, a third step of receiving the initial wireless microphone information outputted at the second step, by the wireless microphone information outputting means from the second connecting terminals with the wireless microphone information receiving means mounted on the wireless microphone supporting device, a fourth step of displaying the initial wireless microphone information received by the wireless microphone information receiving means at the third step.

BRIEF DESCRIPTION OF THE DRAWINGS

The objects, features and advantages of the present invention will become apparent as the description proceeds when taken in conjunction with the accompanying drawings, in which.

DESCRIPTION OF THE PREFERRED EMBODIMENTS

The first preferred embodiment of the wireless microphone information displaying apparatus according to the present invention will now be described in detail in accordance with the accompanying drawings.

Figure 1:
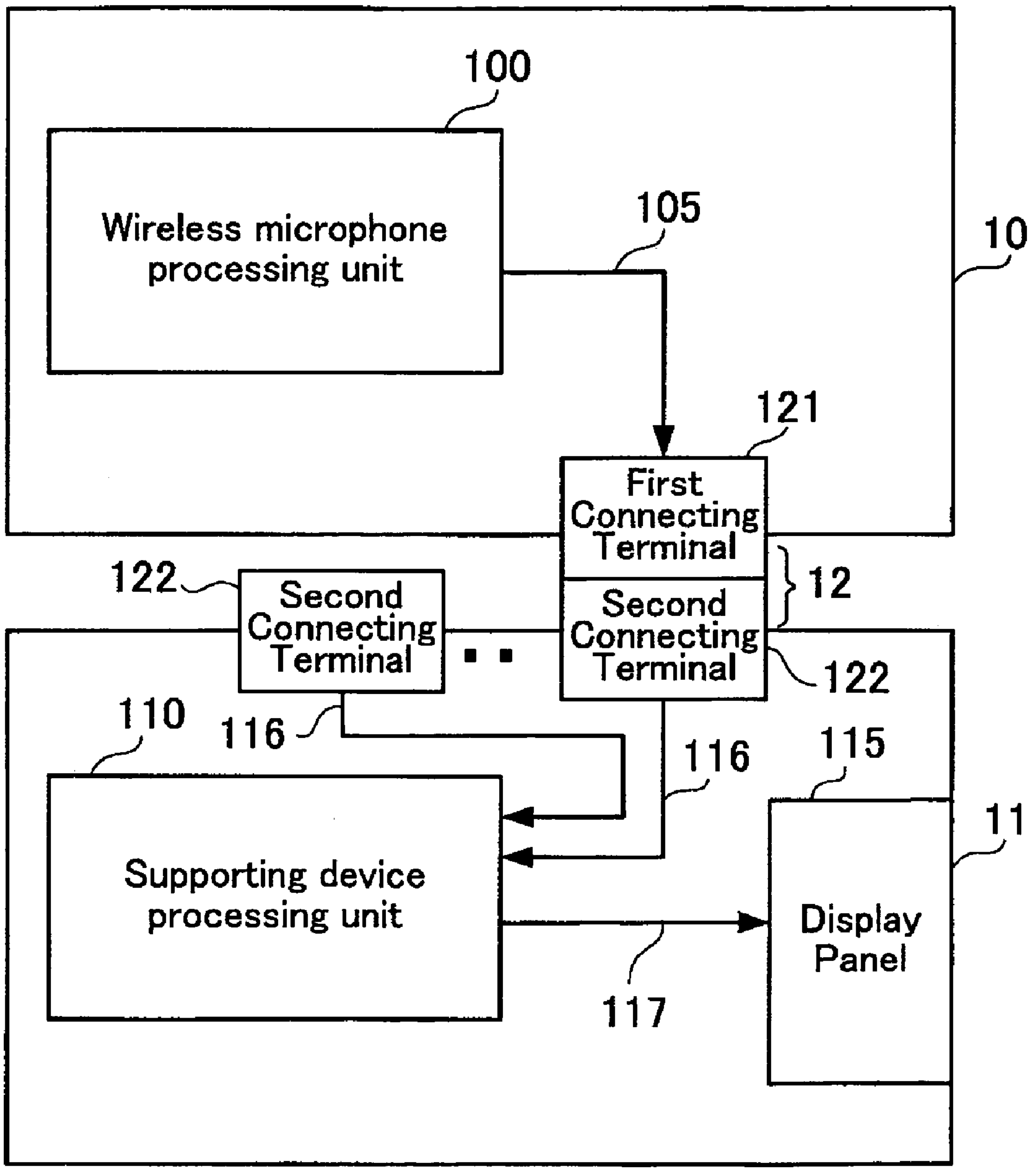
FIG. 1 is a block diagram of a first embodiment of the wireless microphone information displaying apparatus according to the present invention.

Referring now to the drawings, in particular to FIG. 1, there is shown a block diagram of the first preferred embodiment of the wireless microphone information displaying apparatus according to the present invention. The wireless microphone information displaying apparatus 1 comprises a plurality of wireless microphones 10 having initial wireless microphone information respectively assigned thereto, a wireless microphone supporting device 11 having a plurality of supporting portion for supporting the wireless microphones 10, respectively, and a plurality of connecting devices 12 having a plurality of first connecting terminals 121 mounted on the wireless microphones 10, respectively, and a plurality of second connecting terminals 122 mounted on the supporting portions, respectively, of the wireless microphone supporting device 11.

includes a radio signal transmitting unit (not shown in FIG. 1) having a microphone for receiving an audio sound to generate an audio sound signal and a transmitter for transmitting a radio signal carrying the audio sound signal wirelessly through an antenna, a wireless microphone processing unit 100 for processing programs previously installed in the wireless microphone processing unit 100, and a first connecting terminal 121 of the connecting device 12 for being connected to the second connecting terminal 122 of the connecting device 12 mounted on the wireless microphone supporting device.

The wireless microphone supporting device 11 includes plurality of second connecting terminals 122 of the connecting device 12 for being connected to the first connecting terminal 121 of the connecting device 12, a supporting device processing unit 110 for processing programs previously installed in the supporting device processing unit 110, and a display panel for displaying pieces of wireless microphone information based on the processing result of the supporting device processing unit 110.

Further, the wireless microphone information apparatus according to the present invention includes a receiving unit for receiving the radio signal wirelessly transmitted from the wireless microphone 10, though this is not shown in FIG. 1.

Figure 2:
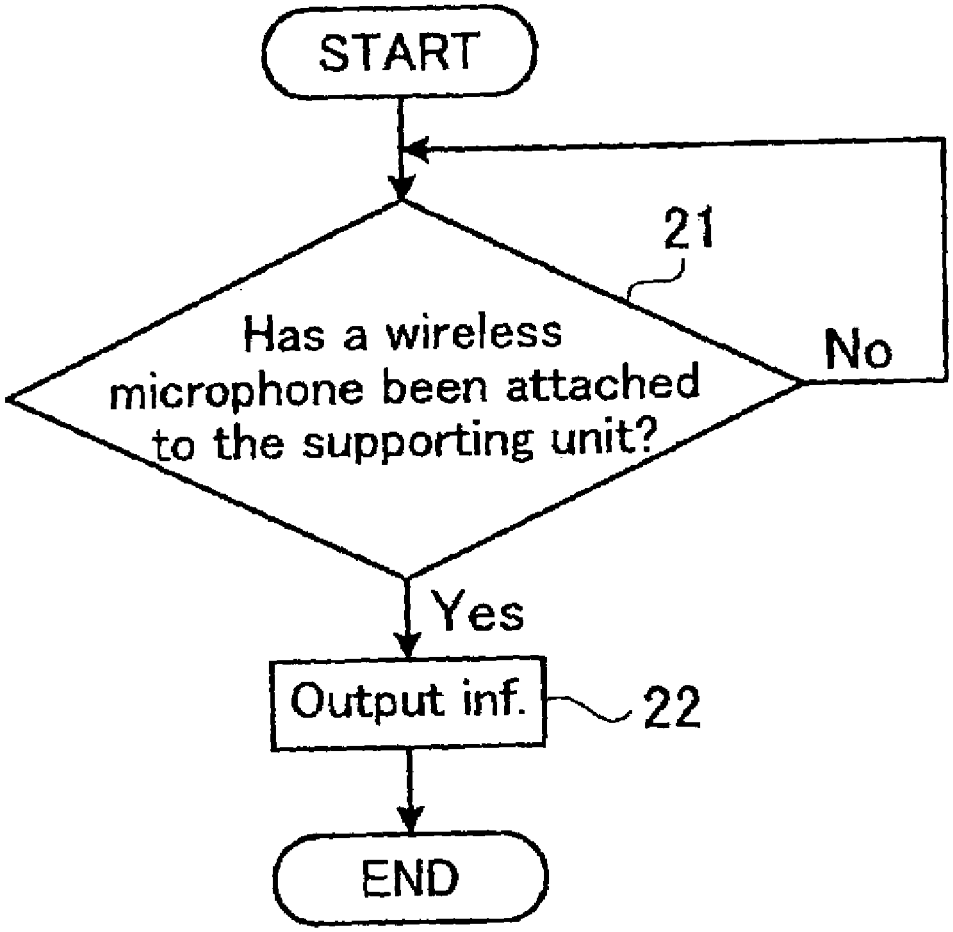
FIG. 2 is a flowchart showing a wireless microphone information outputting process to be performed by the first embodiment of the wireless microphone information displaying apparatus according to the present invention.

Referring to FIG. 2, there is shown a flowchart of a wireless microphone initial information outputting process to be performed by the wireless microphone processing unit 100 in the first embodiment of the wireless microphone information displaying apparatus according to the present invention. In the first embodiment, the wireless microphone processing unit 100 is functions as the wireless microphone initial information outputting means, when the wireless microphone processing unit 100 executes a wireless microphone initial information outputting process based on the wireless microphone initial information outputting program installed in the wireless microphone processing unit 100.

The wireless microphone control unit 100 executes step 21 to determine whether or not the wireless microphone 10 is attached to the wireless microphone supporting device 11. When the answer to step 21 is "No", step 21 is repeatedly executed until the answer becomes "Yes". When the answer to step 21 is "Yes", the information signal indicative of the initial wireless microphone information assigned to wireless microphone 10 is outputted from the wireless microphone processing unit 100 to the first connecting terminals 121 through the information signal transmitting line 105.

Figure 3:
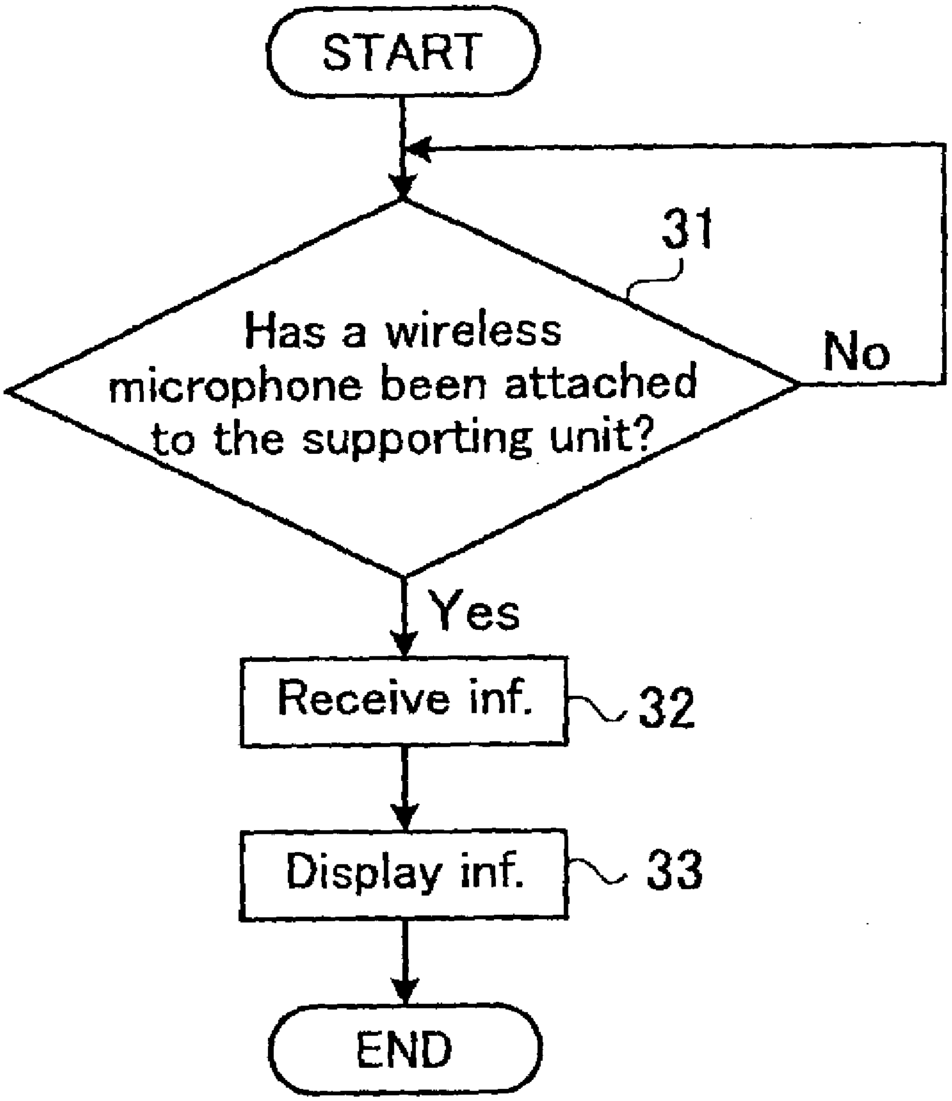
FIG. 3 is a flowchart showing a wireless microphone information receiving and displaying process to be performed by the first embodiment of the wireless microphone information displaying apparatus according to the present invention.

Referring to FIG. 3, there is shown a flowchart of a wireless information receiving and displaying process to be performed by the supporting device control unit 110 in the first embodiment of the wireless microphone information displaying apparatus according to the present. In the first embodiment, the supporting device processing unit 11 functions as the wireless microphone initial information receiving means, when the supporting device processing unit 110 executes a wireless microphone initial information receiving process and a wireless microphone based on the wireless microphone initial information receiving program and installed in the wireless microphone processing unit 100.

The supporting device control unit 110 executes step 31 to determine whether or not the wireless microphone 10 is attached to the wireless microphone supporting device 11. When the answer to step 31 is "No", step 31 is repeatedly executed until the answer becomes "Yes" by making the wireless microphone 10 to attach to the supporting device 11. When the answer to step 31 is "Yes", the information signal indicative of the initial wireless microphone information is fetched into the supporting device processing unit 110 at step 32 through the information signal transmitting line 116. Subsequently, the information signal indicative of the initial wireless microphone information is transmitted to the display panel 115 through the displaying signal transmitting line 117. Accordingly, the initial wireless microphone information are displayed on the display panel 115. In the first embodiment, the supporting device processing unit 11*o* and the display panel 115 function as the initial wireless microphone information displaying means.

Figure 4:
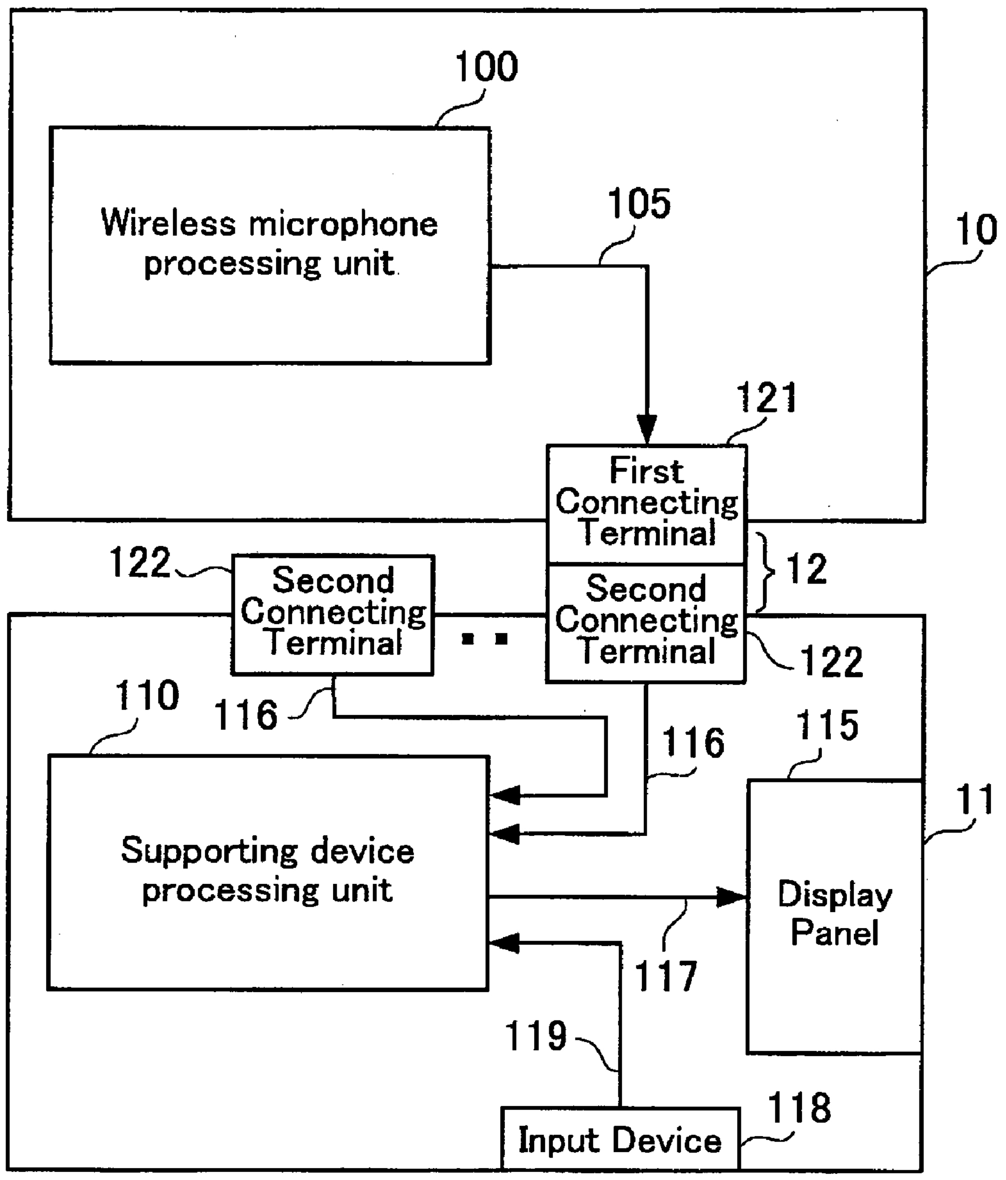
FIG. 4 is a block diagram of a second embodiment of the wireless microphone information displaying apparatus according to the present invention.

Referring now to FIG. 4, there is shown a block diagram of the second preferred embodiment of the information displaying apparatus according to the present invention, an input device 118 such as a pointing device is added to the wireless microphone supporting device 11 for inputting a information modifying command and a modified information.

Figure 5:
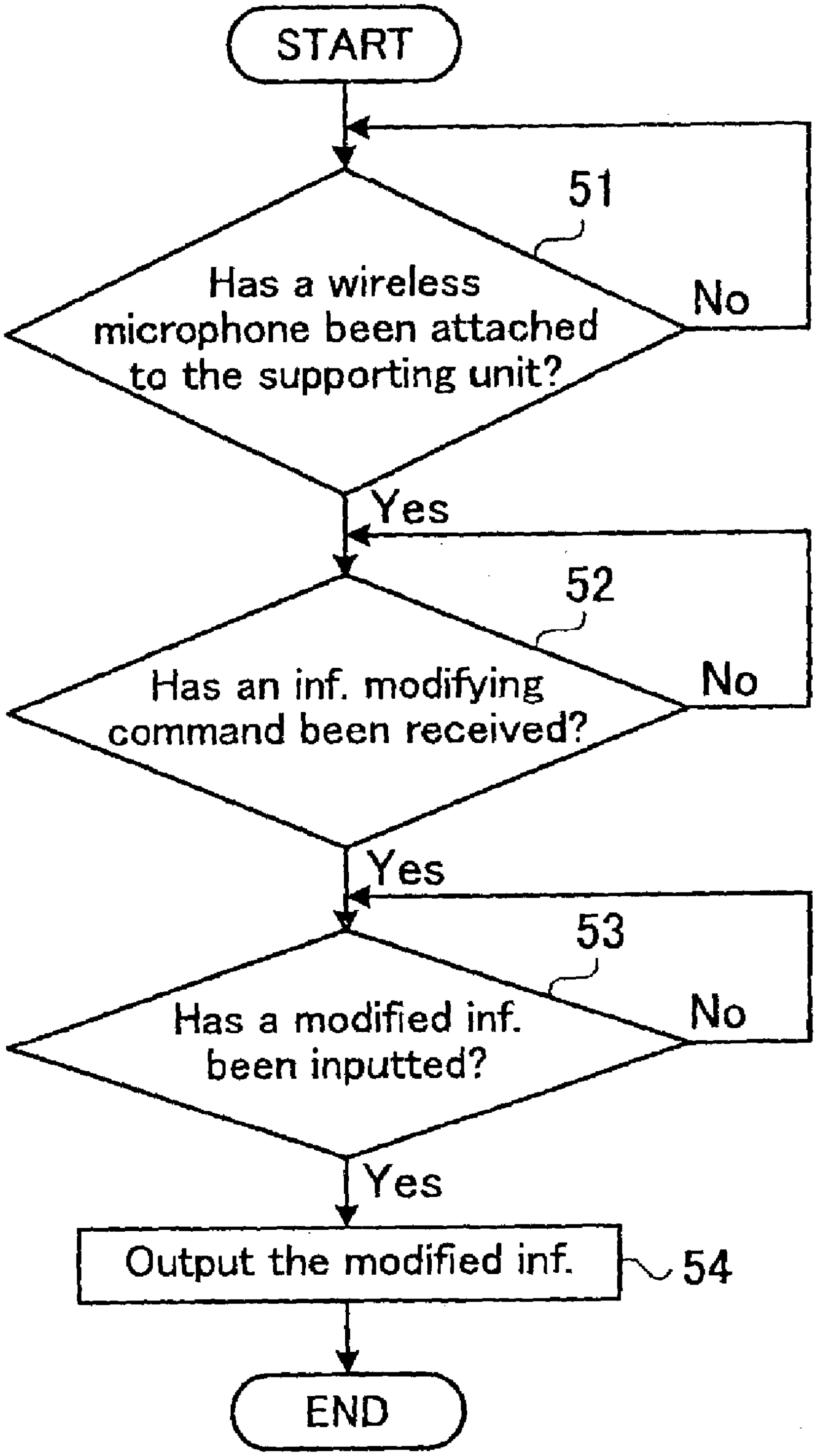
FIG. 5 is a flowchart showing a wireless microphone information modifying process to be performed by the second embodiment of the wireless microphone information displaying apparatus according to the present invention.

Referring to FIG. 5, there is shown a flowchart of an initial wireless microphone information modifying and outputting process to be performed by the supporting device processing unit 110 in the second embodiment of the wireless microphone information displaying apparatus according the present invention.

The supporting device control unit 110 executes step 51 to determine whether or not the wireless microphone 10 is attached to the wireless microphone supporting device 11. When the answer to step 51 is "No", step 51 is repeatedly executed until the answer becomes "Yes" by making the wireless microphone to attach to the supporting device 11. When the answer to step 51 is "Yes", the supporting device control unit 110 execute step 52 to determine whether or not an information modifying command has been inputted through an input signal transmitting line 119 by using the input device 118. When the answer to step 52 is "No", step 52 is repeatedly executed until the answer becomes "Yes". When the answer to step 52 is "Yes", the supporting device control unit 110 executes step 53 to determine whether or not a modified information has been inputted through the input signal transmitting line 119 by using the input device 118. When the answer to step 53 is "No", step 53 is repeatedly executed until the answer becomes "Yes". When the answer to step 52 is "Yes", the supporting device control unit 110 execute step 53 to output the modified information to the second connecting terminals 122 through the information signal transmitting line 116. In the second embodiment, the input device 118 and the supporting device processing unit 110 function as the wireless microphone information modifying and outputting means.

Figure 6:
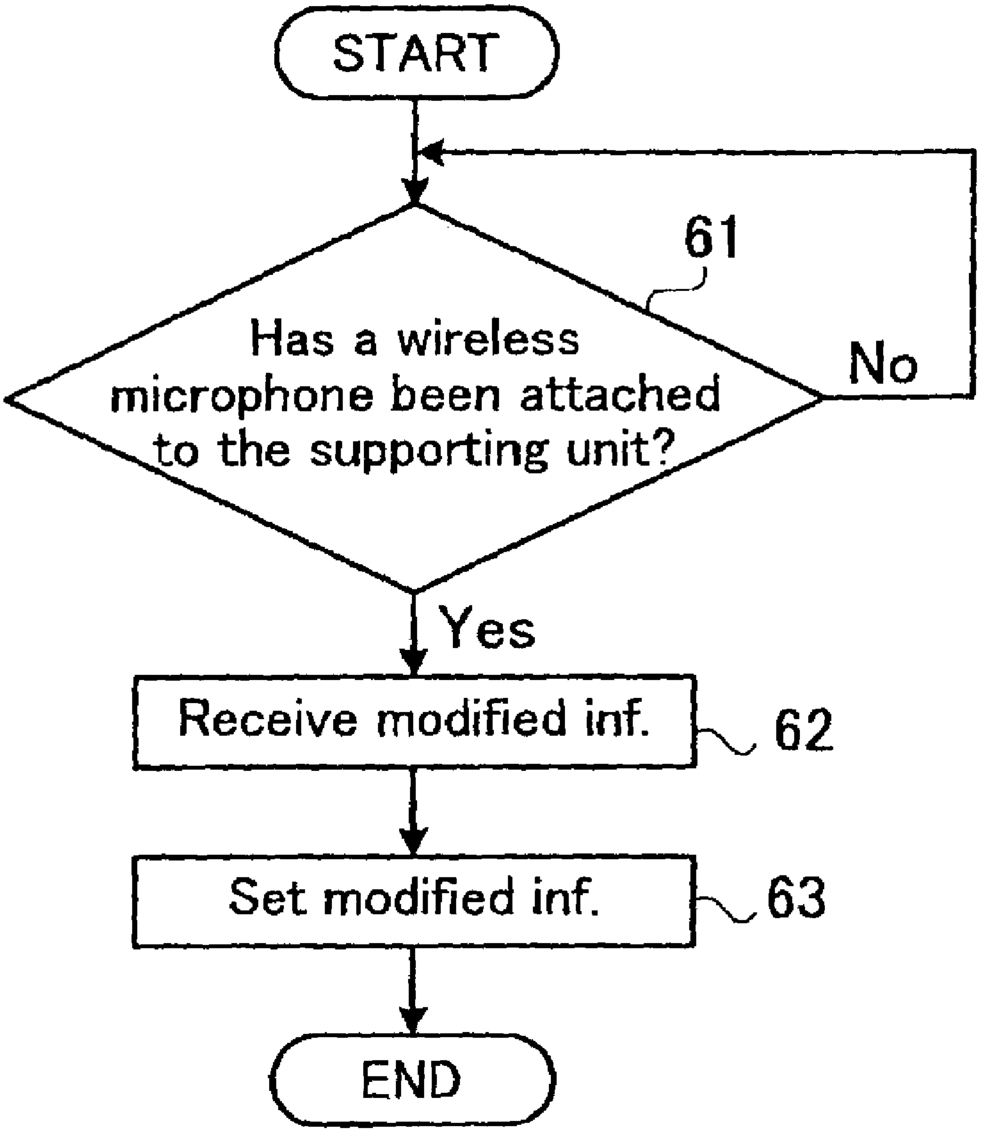
FIG. 6 is a flowchart showing a modified wireless microphone information receiving process to be performed by the second embodiment of the wireless microphone information displaying apparatus according to the present invention.

Referring to FIG. 6, there is shown a flowchart of a modified wireless microphone information receiving and setting process to be performed by the second embodiment of the present invention. The wireless microphone control unit 100 executes step 61 to determine whether or not the wireless microphone 10 is attached to the wireless microphone supporting device 11. When the answer to step 61 is "No", step 61 is repeatedly executed until the answer becomes "Yes". When the answer to step 61 is "Yes", the wireless microphone control unit 100 executes step 62 to receive the modified wireless microphone information from the first connecting terminal 121 through the information signal transmitting line 105. The wireless microphone control unit 100 executes step 63 to store the modified information instead of the initial information in the wireless microphone processing unit 100.

Figure 7:
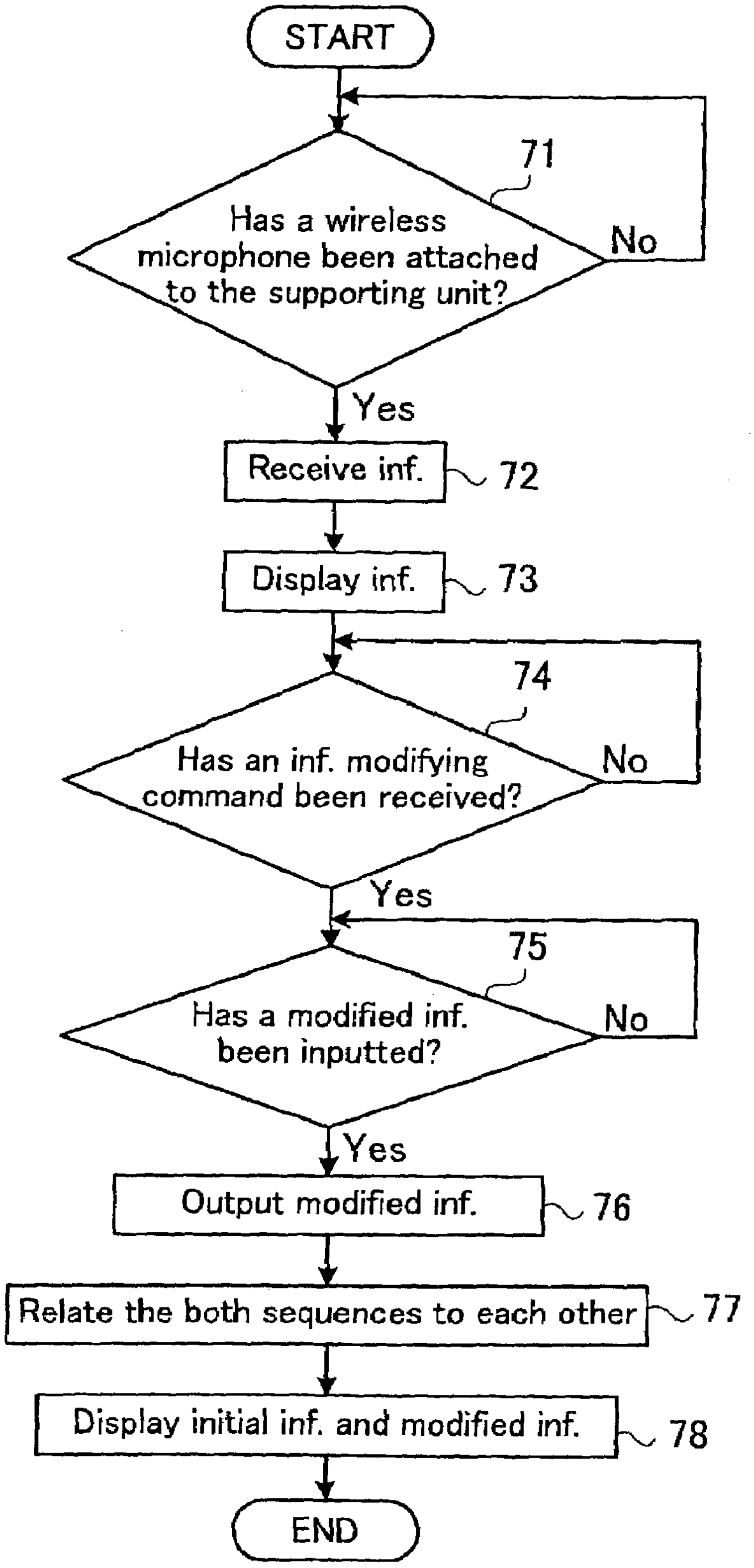
FIG. 7 is a flowchart showing a wireless microphone information relating process to be performed by the third embodiment of the wireless microphone information displaying apparatus according to the present invention.

Referring now to FIG. 7, there is shown a flowchart to show a wireless microphone information arranging process to be performed by the supporting device processing unit 110 in the third preferred embodiment of the wireless microphone information displaying apparatus according to the present invention. The supporting device control unit 110 executes step 71 to determine whether or not the wireless microphone 10 is attached to the wireless microphone supporting device 11. When the answer to step 51 is "No", step 71 is repeatedly executed until the answer becomes "Yes". When the answer to step 71 is "Yes", the supporting device control unit 110 executes step 72 to receive the initial wireless microphone information from the wireless microphones 10. The supporting device control unit 110 executes step 73 to display the initial information on the display panel 115, and executes step 74 to determine whether or not an information modifying command has been inputted through an input signal transmitting line 119 by using the input device 118. When the answer to step 74 is "No", step 74 is repeatedly executed until the answer becomes "Yes". When the answer to step 74 is "Yes", the supporting device control unit 110 executes step 75 to determine whether or not modified information has been the input signal transmitting line 119 by using the input device 118. When the answer to step 75 is "No", step 75 is repeatedly executed until the answer becomes "Yes". When the answer to step 75 is "Yes", the supporting device control unit 110 executes step 76 to output the modified information to the second connecting terminals 122 through the information signal transmitting line 116. The supporting device control unit 110 executes step 77 to arrange one sequence of pieces of the initial wireless microphone information or pieces of the modified wireless microphone information to the other sequence. The supporting device control unit 110 executes step 78 to display the initial information and the modified information simultaneously.

Figure 8:
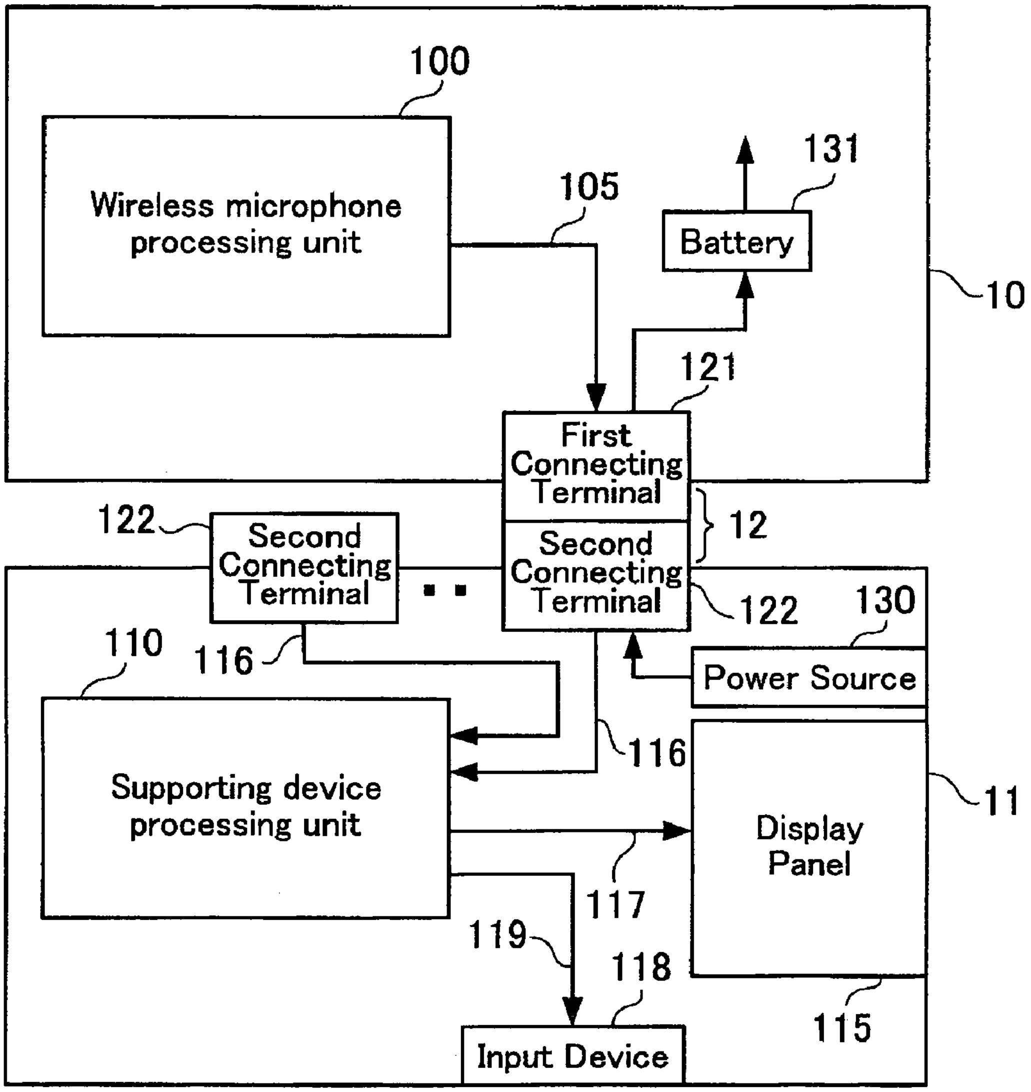
FIG. 8 is a block diagram of a fourth embodiment of the wireless microphone information displaying apparatus according to the present invention.
Figure 9:
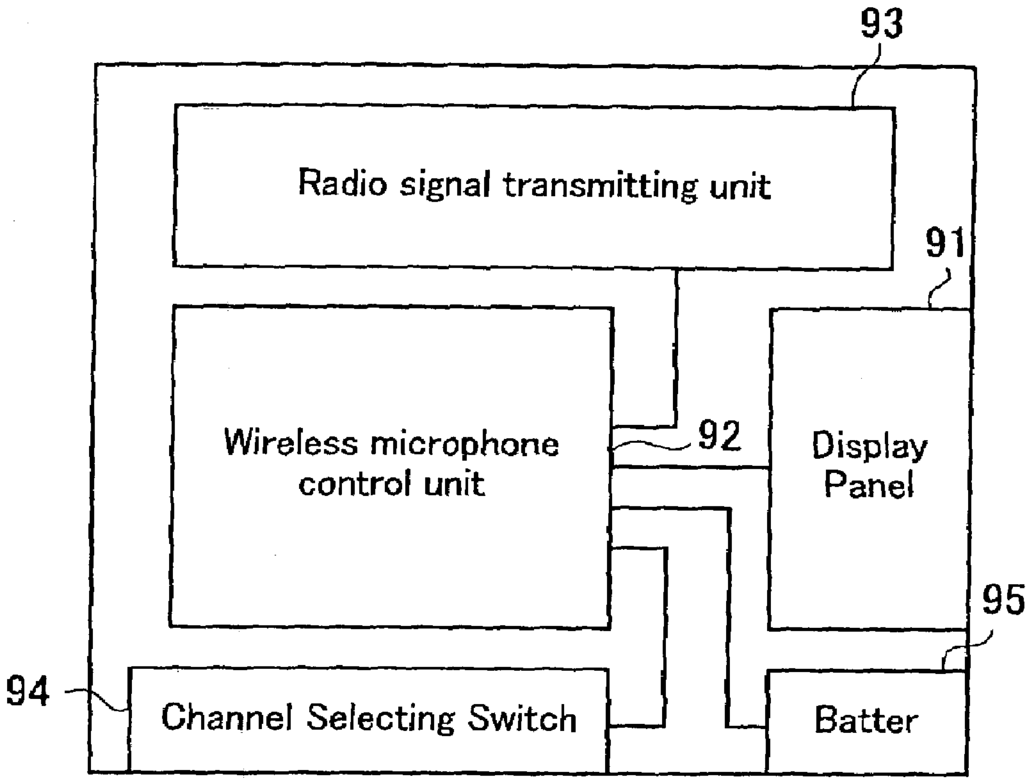
FIG.9 Prior Art
FIG. 9 is a block diagram of a conventional wireless microphone information displaying apparatus.

Referring now to FIG. 8, there is shown a block diagram of the fourth preferred embodiment of the information displaying apparatus according to the present invention, an electrical power source 130 is additionally installed in the wireless microphone supporting device 11, and the electrical power source 130 charges a chargeable battery 131 mounted on the wireless microphones 10 through the connecting devices 12, when the wireless microphones 10 are attached to the wireless microphone supporting device 11.

From the forgoing description, it will be understood that intensive management of all of the wireless microphone information for operating a plurality of wireless microphones in a condition free from interference between the wireless microphones and interruption of transmitting from the wireless microphones, is realized by intensively displaying all of the wireless microphone information on the display panel mounted on the wireless microphone supporting device.

Further, the fact that it is not necessary to mount a display panel on every wireless microphone, results in not only a price decrease of a wireless microphone, but also its weight decrease and its electric power consumption decrease, because wireless microphones are not necessary to mount its own display panels.

It will be understood by a person with ordinary skill in the art that the foregoing description is in terms of preferred embodiments of the present invention wherein various changes and modification may be made without departing from the sprit and scope of the present invention, as set forth in the appended claims.

What is claimed is:

1. A wireless microphone information displaying apparatus, comprising:

a plurality of wireless microphones having initial wireless microphone information respectively assigned thereto;

a wireless microphone supporting device having a plurality of supporting portions for supporting said wireless microphones, respectively; and a plurality of connecting devices each having a first connecting terminal mounted on each of said wireless microphones, and a second connecting terminal mounted on each of said supporting portion of said wireless microphone supporting device, said first connecting terminals and said second connecting terminals being electrically connected to each other;

each of said wireless microphones including wireless microphone information outputting means for outputting said initial wireless microphone information to said first connecting terminals, respectively; and said wireless microphone supporting device including wireless microphone information receiving means for receiving pieces of said initial wireless microphone information outputted by said wireless microphone information outputting means of said wireless microphones through said second connecting terminals, and wireless microphone information displaying means for displaying said initial wireless microphone information received by said initial wireless microphone information receiving means when said first connecting terminals of said wireless microphones are electrically engaged with said second connecting terminals, respectively, of said supporting device, and further including wireless microphone information modifying and outputting means for modifying said initial wireless microphone information into another type of wireless microphone information to have said another type of wireless microphone information being distinguished from said initial wireless microphone information, and outputting said modified wireless microphone information to said second connecting terminals, and, each of said wireless microphones further including modified wireless microphone information receiving means for receiving said modified wireless microphone information from said wireless microphone information modifying and outputting means through said first connecting terminals, and modified wireless microphone information setting means for setting said modified wireless microphone information for revising said initial wireless microphone information.

2. A wireless microphone information displaying apparatus as set forth in claim 1, in which said wireless microphone supporting device further includes a arranging means for arranging one sequence of pieces of said modified wireless microphone information modified by said wireless microphone information modifying and outputting means or pieces of said initial wireless microphone information outputted from said wireless microphone information outputting means of said wireless microphones to the other sequence in order to display said initial wireless microphone information and said modified wireless microphone information simultaneously on said wireless microphone information displaying means.

3. A wireless microphone information displaying apparatus as set forth in any one of claims 1 and 2, in which said wireless microphone supporting device further includes an electric power source to charge rechargeable batteries mounted on said wireless microphones through said connecting devices, when said first connecting terminals of said wireless microphones are electrically engaged to said second connecting terminals of said supporting device.

* * * * *